Jan. 29, 1935.    D. W. JONES    1,989,365
SCROLL SAW
Filed March 19, 1934
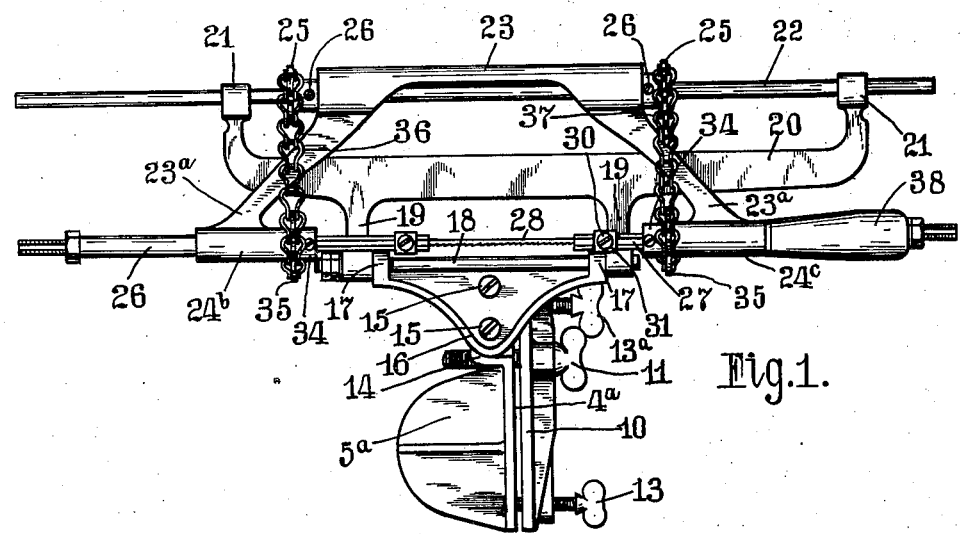
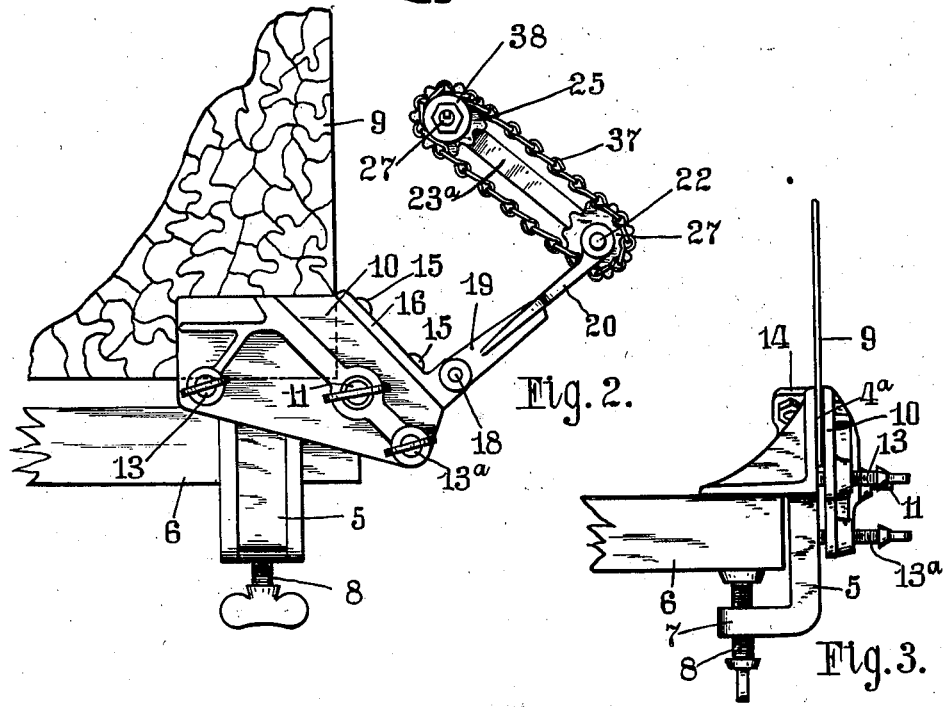
Inventor
DAVID W. JONES
Attorneys Patented Jan. 29, 1935

1,989,365

UNITED STATES PATENT OFFICE 1,989,365

SCROLL SAW

David W. Jones, Columbus, Ohio

Application March 19, 1934, Serial No. 716,299

2 Claims. (Cl. 143—70)

This invention relates to scroll saws and especially to the kind that are adapted for cutting in a sheet of wood designs or patterns with curved or irregular lines. Oftentimes the lines to be cut are sharply curved or angular; and even with very narrow blade necessarily employed in such work it twists making it difficult to operate or causing a rupturing of the blade. The cause of this difficulty is that the saw blade has had the turning force applied to it at one end only in directing it out of a right line.

The chief object of the present invention is to provide means whereby torquing pressure to turn the blade is applied substantially equally to both ends of the blade so as always to maintain the blade in a flat or untwisted condition and thereby overcome the difficulties referred too.

Other objects of the invention will appear from the disclosure herein.

The invention is embodied in the example herein shown and described, the features of novelty being finally claimed.

In the accompanying drawing—

Figure 1 is a top plan view of the device according to my invention.

Fig. 2 is an elevation looking at the right hand end of Fig. 1, but in this view showing the device applied to the margin of a table or bench.

Fig. 3 is a view in elevation looking at the support member alone and the means for connecting it to the margin of a table or bench.

The frame for supporting the working members consists conveniently of a metal casting 5 having at its lower portion a clamp extension 5ª that bears on the upper surface of the margin of a work bench or table, as at 6, and a leg 7 containing a clamping screw 8 to pinch the lower side of the margin of the table opposite the clamp extension 5ª so as firmly to hold said supporting frame.

The vertical face of said casting forms a clamping surface 4ª for holding the sheet 9 of wood or other material sawed or to be sawed, said sheet being initially clamped against said vertical face 4ª by means of a movable clamping plate 10 supported rockingly on an adjustable headed screw 11 threaded into the casting 5. To position and secure the sheet 9 between the clamping surfaces, the movable clamping plate 10 has two screws 13 and 13ª, flanking the screw 11. The screw 13ª is first turned against the surface 4ª to tilt the plate 10 on the screw 11 to pinch the sheet 9 between said plate and the surface 4ª, the end of screw 13 serving with plate 16 to support the sheet 9 with its lower edge in horizontal or other desired position between said plates.

The casting 5 also includes an inclined flange 14 to which is fixed by screws 15, 15, the plate 16 having perforated widely spaced ears 17, 17, constituting the bearing for movable working frames. Secured in the bearing 17, 17, by means of a cotter pin and nuts, as shown, is a rod 18 to which is connected the arms 19, 19, of the inner swinging frame 20. At its opposite edge the frame 20 is provided with perforated ears 21, 21, in which slides and rocks a rod 22, of the saw carrying frame, said rod being of considerably greater length than the distance between the ears 21, 21 to permit reciprocations of the saw frame for the sawing operation, as hereinafter appears.

The character 23 designates the outer or saw-carrying frame. Said frame 23 has its axis of motion in the ears 21, 21, and is held in position on said rod 22 by set screws 26 in the hubs of sprocket wheels 25, 25, said hubs and sprocket wheels each being secured to said rod 22 by said set screws 26.

The frame 23 includes divergent arms 23ª, the extremities of which are provided with elongated tubular bearings 24ᵇ, 24ᶜ, alined with one another and parallel to the rod 22. Rotatable in said bearings 24ᵇ and 24ᶜ are rods 26 and 27 to receive the opposite ends of the saw blade as shown at 28. The rods 26 and 27 are each provided with longitudinal grooves that are alined to receive the opposite ends of the saw blade, said blade being clamped at its opposite ends in said grooves by means of a wedge key member pinched tightly against the saw blade by the end of a set screw 30 carried in a block 31 perforated to slide onto the rod.

Each of said rods 26 and 27 has secured to it by a set screw the hub 34 of a sprocket wheel 35, said sprocket wheels standing respectively in the same plane as the sprocket wheels 25. Said sprocket wheels are connected by sprocket chains as shown at 36 and 37 so that when the rod 26 is rotated, as by means of a handle 38 secured thereto, the turning movement thereof is communicated through the rod 22, sprocket chain 37 and sprocket wheel 25 to the sprocket wheel 35 and the rod 27. When the sprocket wheels and the sprocket chains are identical and care taken in the construction to prevent slippage the turning movements, in either direction, are identical hence torquing or twists of the saw blade is avoided.

Or to state the matter in another way the application of twisting power to the handle-end of the saw blade is circuited around the blade to the other end of the blade, and any lag of the other end of the blade due to its pressure in the saw kerf or friction at the bearing holding the opposite end of the blade is overcome.

The forms of the parts can be changed without departing from the gist of the invention as claimed.

What I claim is:

1. A scroll saw including a supporting frame provided with means for attaching the same to a table or work bench, a second frame hinged to said supporting frame, said second frame having bearings at its free portion, a third frame carrying a shaft slidably and rotatably supported in the said bearings, said third frame having at its free portion means for rotatably holding a saw blade at each of its ends, means whereby said rotatable means may be rotated and means for equalizing torquing pressure on said saw holding means.

2. A scroll saw including a supporting frame provided with means for attaching the same to a table or work bench, a second frame hinged to said supporting frame, said second frame having bearings at its free portion, a third frame carrying a shaft slidably and rotatably supported in the said bearings, said third frame having at its free portion means for rotatably holding a saw blade at each of its ends, means whereby said rotatable means may be rotated and means for equalizing torquing pressure on said saw blade holders, said torquing pressure equalizing means including sprocket wheels fixed on said saw blade holders, sprocket wheels carried by said shaft and sprocket chains operably connecting the sprocket wheels of said saw blade holders with the sprocket wheels of said shaft.

DAVID W. JONES.